United States Patent
Westberg et al.

[11] Patent Number: 6,137,399
[45] Date of Patent: Oct. 24, 2000

[54] HIGH PERFORMANCE TACHOMETER HAVING A SHIFT INDICATOR SYSTEM WITH "SHORT-SHIFT" PROTECTION

[75] Inventors: John V. Westberg, Kingston; Brian S. Martens, Dixon, both of Ill.

[73] Assignee: Auto Meter Products, Inc., Sycamore, Ill.

[21] Appl. No.: 09/432,458

[22] Filed: Nov. 2, 1999

[51] Int. Cl.[7] .................................................. B60Q 1/00
[52] U.S. Cl. ........................ 340/441; 340/439; 340/456; 340/461; 324/160; 324/161; 324/169
[58] Field of Search .................................. 340/439, 438, 340/456, 457, 461, 441; 324/160, 169, 161, 166; 364/431.09, 424.1, 436, 424.04; 701/64, 70; 702/142

[56] References Cited

U.S. PATENT DOCUMENTS

| | | | |
|---|---|---|---|
| 3,818,342 | 6/1974 | Stevens | 324/169 |
| 3,822,402 | 7/1974 | Vest | 324/169 |
| 3,835,382 | 9/1974 | Weisbart | 324/161 |
| 3,906,437 | 9/1975 | Brandwein et al. | 340/27 |
| 3,921,946 | 11/1975 | Norton et al. | 246/182 |
| 3,950,700 | 4/1976 | Weisbart | 324/161 |
| 4,174,766 | 11/1979 | Kalogerson | 340/52 D |
| 4,188,618 | 2/1980 | Weisbart | 340/201 |
| 4,236,215 | 11/1980 | Callhan et al. | 364/436 |
| 4,241,403 | 12/1980 | Schultz | 364/300 |
| 4,258,421 | 3/1981 | Juhasz et al. | 364/424 |
| 4,262,641 | 4/1981 | Mosely et al. | 324/166 |
| 4,395,624 | 7/1983 | Wartski | 324/166 |
| 4,438,423 | 3/1984 | Stier | 340/52 R |
| 4,439,833 | 3/1984 | Yamaguchi et al. | 364/431.09 |
| 4,442,424 | 4/1984 | Shirasaki et al. | 340/521 |
| 4,551,725 | 11/1985 | Schaffer | 343/6.5 SS |
| 4,551,801 | 11/1985 | Sokol | 364/424 |
| 4,593,357 | 6/1986 | Van Ostrand et al. | 364/424 |
| 4,701,852 | 10/1987 | Klueland | 364/424.01 |

(List continued on next page.)

FOREIGN PATENT DOCUMENTS

| | | |
|---|---|---|
| 0074330 A1 | 3/1983 | European Pat. Off. . |
| WO 89/12279 | 12/1989 | WIPO . |

OTHER PUBLICATIONS

A product advertisement, including functional and display descriptions, of tachometers made by Stack, Inc. The advertisement was prepared in Oct. 1994, but the products or information described therein are believed to have been publicly known or available before Aug. 31, 1994 (pp. 35 and 79).

A product advertisement, including functional and display descriptions, of tachometers made by Stack, Inc. The products or information described therein are believed to have been publicly known or available before Aug. 31, 1994 (8 pages).

A product advertisement, advertising the "Eliminator" series tachometer made by VDO. The "Eliminator" series tachometer is believed to have been publicly known or available at least as early as Nov. 1992.

(List continued on next page.)

*Primary Examiner*—Jeffery A. Hofsass
*Assistant Examiner*—Phung Nguyen
*Attorney, Agent, or Firm*—Jenkens & Gilchrist; Stephen G. Rudisill

[57] ABSTRACT

A high performance tachometer is provided for use in high performance racing vehicles, such as dragsters. The tachometer has an input signal indicative of the vehicular engine speed and an output display for displaying the instantaneous engine speed as indicated by the input signal. The tachometer includes input controls for directing the control and operation of the tachometer. Special features associated with the tachometer include a shift indicator. The system is designed to monitor an engine speed or RPM profile and utilize information from this profile to operate the shift setpoint selection, shift display enablement and the shift indicator.

38 Claims, 15 Drawing Sheets

U.S. PATENT DOCUMENTS

| | | | |
|---|---|---|---|
| 4,731,727 | 3/1988 | Rauch et al. .............................. | 364/442 |
| 4,740,905 | 4/1988 | Murakamie et al. .................... | 324/166 |
| 4,823,367 | 4/1989 | Kreutzfeld .............................. | 377/24.2 |
| 4,853,856 | 8/1989 | Hanway .............................. | 364/424.01 |
| 4,873,891 | 10/1989 | Guanciale .................................. | 73/117 |
| 4,926,331 | 5/1990 | Windle et al. ...................... | 364/424.04 |
| 4,993,383 | 2/1991 | Wokan et al. ........................... | 123/399 |
| 5,017,916 | 5/1991 | Londt et al. ........................ | 340/870.13 |
| 5,047,761 | 9/1991 | Sell ..................................... | 340/815.1 |
| 5,051,688 | 9/1991 | Murase et al. ........................... | 324/143 |
| 5,099,396 | 3/1992 | Barz et al. .............................. | 361/424 |
| 5,173,856 | 12/1992 | Purnell et al. ...................... | 364/424.04 |
| 5,309,139 | 5/1994 | Austin ..................................... | 340/462 |
| 5,359,284 | 10/1994 | Hawes et al. ........................... | 324/146 |
| 5,471,894 | 12/1995 | McFadden ............................ | 74/336 R |
| 5,477,452 | 12/1995 | Milunas et al. ....................... | 364/424.1 |
| 5,537,885 | 7/1996 | Thomas .................................... | 74/335 |
| 5,552,761 | 9/1996 | Kazyaka ................................. | 340/456 |
| 5,905,374 | 5/1999 | Westberg et al. ....................... | 324/160 |
| 5,941,922 | 8/1999 | Price et al. ................................. | 701/51 |
| 5,982,168 | 11/1999 | Westberg et al. ....................... | 324/160 |
| 6,018,294 | 1/2000 | Vogel et al. ............................ | 340/456 |

OTHER PUBLICATIONS

A product advertisement, advertising a "Two Step" and a "Three Step" module selectors, made by MSD Ignition. The "Two Step" selector is believed to have been publicly known or available at least as early as 1989. The "Three Step" selector is believed to have been publicly known or available at least as early as 1992.

A product advertisement, advertising a data logger made by TachTime. The data logger is believed to have been publicly known or available before Aug. 31, 1994.

A product advertisement, advertising the Star 1000 Onboard Computer, made by Star Race Computers. The Star 1000 is believed to have been publicly known or available before 1992.

A product advertisement, advertising a Dedenbear Delay Box, made by Dedenbear Products, Inc. The advertisement appeared in the Dec. 12, 1992, National Dragster magazine, but the product is believed to have been publicly known or available in 1988.

A product advertisement, advertising the VC200 Computer, available from Minnetonka Warehouse Supply, Inc. The source and date of the advertisement are unknown, but it is believed that the VC200 was publicly known or available before Aug. 31, 1994.

A product advertisement, advertising "The Informer 1+2" digital tachometer, made by Informer Race Products, Inc. The source and date of the advertisement are unknown, but it is believed that "The Informer 1+2" was publicly known or available before Aug. 31, 1994.

A product advertisement, advertising the DS–100 and DS–500 performance computers, available from Race and Performance Monitoring. The source and date of the advertisement are unknown, but it is believed that DS–100 and DS–500 were publicly known or available before Aug. 31, 1994.

A product advertisement, advertising a split–shift control box, made by Advanced Control Devices. The advertisement is believed to have been printed in the Jan. 28, 1994, issue of National Dragster Magazine.

A product advertisement, advertising the "Race Trakker", a product of A.R.M. Research, Inc. The source and date of the advertisement are unknown, but it is believed that the "Race Trakker" was publicly known or available before Aug. 31, 1994.

"Microprocessor–Controlled Vehicle Performance Recorder," Manufacturing Tecnology Note, U.S. Army Materiel Command, Jul. 1986 (one page).

"Black Magic in '89 Lola Indycar," Autoweek, Jan. 30, 1989 (one page).

"No. 1 For Good Reasons," a product advertisement published in 1995 for the Ultimate™ Playback™ Tachometer by Auto Meter Products, Inc.

"Playback Your Race," a product advertisement published in 1995 for the Ultimate™ Playback™ Tachometer by Auto Meter Products, Inc.

"Do You Run This Tach?," a product advertisement published in 1995 for the Ultimate™ Playback™ Tachometer by Auto Meter Products, Inc.

"Playback™ Your Race—The Ultimate™ Tachometer," a product advertisement published in 1995 for the Ultimate™ Playback™ Tachometer by Auto Meter Products, Inc.

"Ultimate 5 Playback™ Tachometer," p. 51 of 1997 catalog of Auto Meter Products, Inc.

"Sport–Comp Shift–Lite™ Tachometer," pages from 1987 Catalog of Auto Meter Products, Inc.

EXAMPLE OF AN ENGINE SHIFT PROFILE 006,137,399

HIGH PERFORMANCE TACHOMETER HAVING A SHIFT INDICATOR SYSTEM WITH "SHORT-SHIFT" PROTECTION

FIELD OF THE INVENTION

The present invention relates to tachometers, and more particularly, to high performance automotive tachometers, and still more particularly to a high performance automotive tachometer having a shift indicator system.

BACKGROUND OF THE INVENTION

In the world of high-speed auto racing, extreme demands are placed on both car and driver. Nowhere is this more true than in the realm of high-speed, short-duration racing, such as drag racing. In these races, drivers command high performance vehicles to accelerate through one-quarter mile of roadway in approximately seven seconds, reaching speeds of over 200 miles per hour. Frequently, the drivers and vehicles are so competitively matched that as little as one thousandth of one second can make the difference between winning and losing a race. Accordingly, drivers look for any way to improve their performance and consistency, even if only by the smallest of margins.

In this regard, drivers train heavily on effective gear shifting. During a typical, seven second racing interval, the driver must normally shift through four or five gears. Indeed, in the professional drag racing circuit, driving skill plays a significant role in the outcome of the race. Not only should the driver be able to shift quickly and cleanly, but the driver should also shift at the appropriate engine speeds to extract the maximum power and racing speed from the vehicle. To be sure, the characteristics of any given vehicle (e.g., aerodynamics, etc.) combine to define a maximum performance curve for each gear of that vehicle. This performance curve, in turn, defines the optimum engine speed for each gear at which the driver should shift in order to effect maximum speed from the vehicle. In addition to rote practice, however, drivers also look to instrumentation or other driving aids to help them properly time and execute these critical shifts at the appropriate points along the power curves.

Of course, tachometers have long been known to provide a vehicle operator with an instantaneous display of engine speed. Other engine speed sensing devices are known to provide what can be generally referred to as "RPM switches." These RPM switches are typically individual, stand-alone units adapted to monitor the engine speed and signal or otherwise act upon the detection of certain desired engine speeds. RPM switches are used in a variety of applications such as controlling nitrous oxide injectors, limiting the engine RPM, controlling system ignition timing, and operating shift lights, just to name a few. An RPM switch may be dedicated to control a shift light, which illuminates at certain preprogrammed engine speeds to prompt the driver to shift gears. Shift lights may be provided in connection with an RPM switch imbedded within the tachometer or in a separate control box. These current art devices basically use the logic of an RPM comparator to compare the engine's instantaneous RPM with a preselected Shift Point (SP) RPM. Whenever the preselected shift point RPM for the first shift (i.e., SP1) is reached, the Shift Light Indicator is energized and the circuit logic shifts the RPM comparator onward to the Second Shift Shift Point RPM (SP2).

This sequential pattern of triggering the Shift Light display when the Shift Point RPM is reached and then shifting the RPM comparator value to that RPM preselected for the next Shift Point occurs for each successive gear change.

There are two main problems with this control logic used in all existing art:

1. Over-Rev at launch:

As the race car leaves the starting line at max power it is easy for the tires to lose traction and the engine to achieve a high enough RPM to trigger the Shift Point setting for the first shift (SP1). When this occurs, the Shift Light will be energized "ON" and the control logic will now be sequenced to be looking for the second Shift Point RPM while the car will still be in first gear. This poses a problem for the driver in that for this race his Shift Point RPM logic will now always be one preselected Shift Point RPM ahead of the Shift Point he will be looking to make.

2. Shifting too early:

Occasionally, whether because of a loss of traction or just a slight error in timing, a driver will shift early before the engine gets up to the desired RPM shift point. This early shift is often called a "Short Shift."

When a Short Shift occurs, the preselected Shift Point RPM was not achieved thus the Shift Light would not have been energized and very importantly, the RPM comparator logic would not have been switched onward for the next preselected Shift Point RPM value.

In this case, the Shift Light control logic would now be one preselected Shift Point RPM behind from the shift the driver was looking to make for the rest of that race.

SUMMARY OF THE INVENTION

In one embodiment of the present invention a shift light is controlled by two logic systems. The Secondary logic system is simply an RPM comparison of the instantaneous RPM with one of several preselected Shift Point RPM's (SP1 for the First Shift as an example), and if the engine RPM exceeds SP1 for example and if the Shift Light has been "Enabled" by the Primary Logic system then the Shift Light will be turned "ON" to notify the driver.

If on the other hand the Shift Light has been "Disabled" by the Primary logic system, the Shift Light will not be turned "ON" even though the Secondary logic may instruct the Shift Light to be turned "ON."

The particular preselected Shift Point RPM to be considered as the "target" RPM for the Secondary logic's comparator out of the several preselected Shift Point RPM's is controlled by the Primary logic system.

The primary logic control system by virtue of an operator adjusted initial "delay" is able to "Disable" the Shift Light and to delay the start of the Primary logic system to allow for the possible over-rev at launch (described as problem #1 in the "Background of the Invention").

Once this "delay" period has expired, the Primary logic system will begin its overall monitoring of events and control of the Enabling and Disabling of the Shift Light plus the control of the advancing of the Shift Point RPM to the next preselected value whenever a gear change is made.

The Primary logic algorithm is able to detect the actual shifting of each gear performed by the driver. In this way if a driver short shifts, the algorithm detects the short shift and even though the Shift Light never came "ON," the Primary logic algorithm will instruct the Secondary logic system to begin looking for the next preselected Shift Point RPM.

This provides the solution to the prior art's inability to properly respond to instances when the driver shifts gears too early (described as problem #2 in the "Background of the Invention").

DETAILED DESCRIPTION OF THE ILLUSTRATED EMBODIMENT

Figure 1:
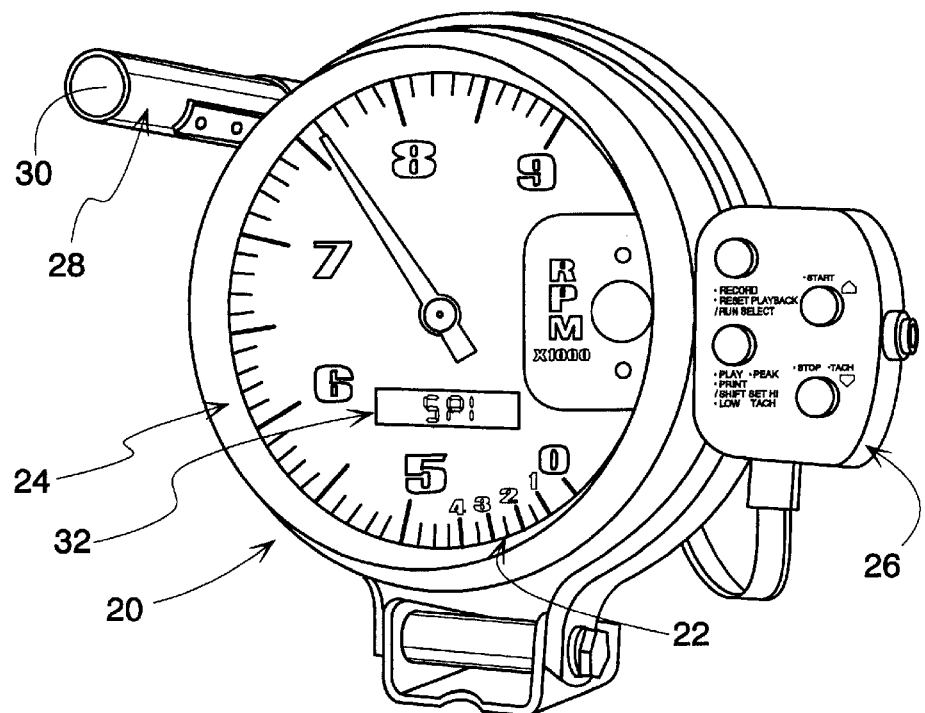
FIG. 1 is a front perspective view of a first tachometer having an indicator system in accordance with the invention.
Figure 2:
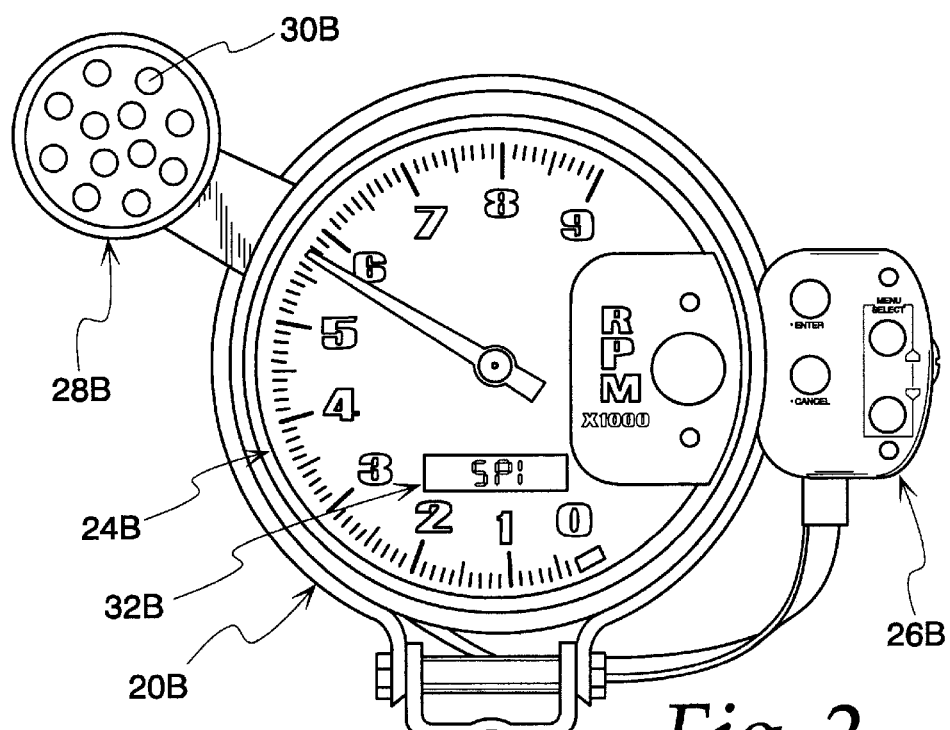
FIG. 2 is a front plan view of a second tachometer having a shift indicator system in accordance with the invention.

Referring now to the drawings, and initially to FIGS. 1 and 2, there are illustrated two embodiments of a high performance tachometer having a shift indicator system in accordance with the invention. The tachometer 20 of FIG. 1 happens to include a first compressed RPM reading range 22 which goes from 0–5,000 RPMs and a second or expanded RPM range 24 which extends from 5,000–9,000 RPM. The tachometer 20b of FIG. 2 happens to have a single RPM readout range 24b with substantially equal RPM incremental scale markings indicated from 0–9,000 RPM. Both tachometers 20 and 20b have operator accessible input control modules 26 and 26b which offer various controls to an operator, here illustrated in the form of pushbuttons.

In accordance with one aspect of the invention, both tachometers 20 and 20b include a shift setpoint indicator display element 28, 28b, which in the illustrated embodiments are mounted to the upper left-hand portion of the tachometer 20, 20b. The indicator or display element 28 includes a single LED indicator 30 whereas the indicator or display 28b includes an array of LED indicators 30b which in the illustrated embodiment are illuminated in unison to advise the driver of an optimum or preferred time for shifting gears such as during a race or the like.

Both tachometers also include a digital or alphanumeric display window 32, 32b for displaying additional information to a vehicle operator. While the invention is described herein with reference to the shifting of gears in a racing car, it may be employed in vehicles of different types and in other situations or applications, without departing from the invention.

Figure 3:
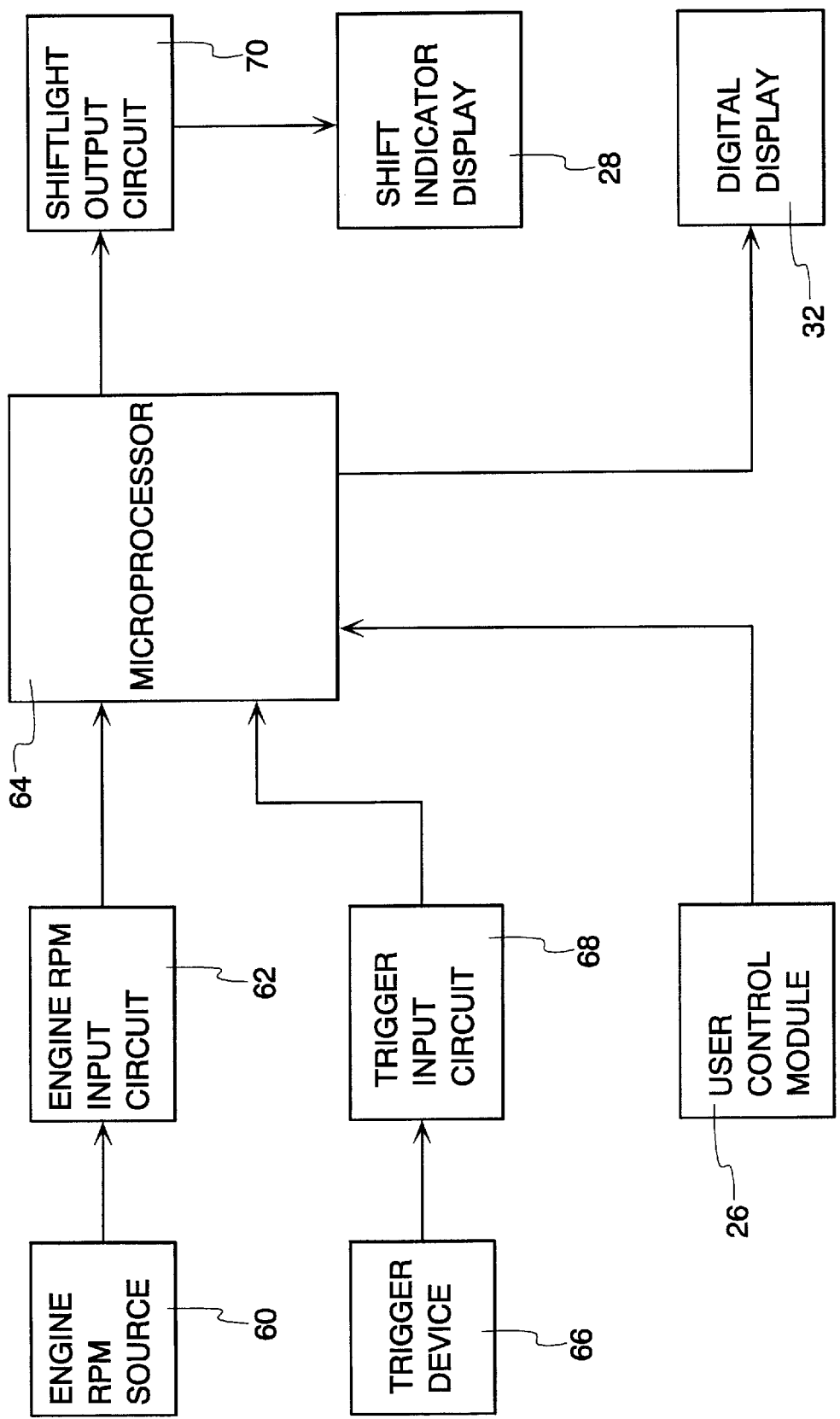
FIG. 3 is a functional block diagram of the shift indicator system of the invention.

Referring now to FIG. 3, the structure and operation of the invention will be described in general terms with reference to a block diagram of one embodiment of the invention. The flowchart of FIG. 5 also indicates the sequence of operation described below. A source of an engine RPM signal corresponding to the engine speed (RPM) is designated generally by the reference numeral 60. This source 60 may be a suitable available source such as a sensor on the crankshaft of the engine (crank trigger), a low voltage or primary side of an ignition, or a tachometer output from an electronic transmission. A signal output of the signal source 60 corresponds generally to the engine speed (RPM) and is conditioned at engine RPM input circuitry 62 to a form useable by a controller 64. The controller 64 may comprise a microprocessor or microcontroller. The RPM input circuitry 62 may include noise filtering, signal level adjustment and isolation between the source 60 and the controller 64.

A trigger device 66 is provided to initiate the shift indicator process. The trigger device 66 may take various forms, for example, a switch or button operated by the race car driver or other operator. The trigger device 66 may alternatively comprise an electrical connection to a suitable sensor or other device that monitors a braking device which holds the vehicle motionless prior to the beginning of acceleration. As yet another alternative, the device 66 may include a sensor which detects the initial acceleration or forward motion of the vehicle. The triggering device 66 outputs a triggering signal to trigger input circuitry 68, which produces an input signal in a form suitable for use by the controller 64 in similar fashion to the engine RPM circuitry 62, namely by providing functions such as noise filtering, signal level adjustment and isolation.

The shift indicator element 28, which may comprise LEDs 30 such as shown in FIGS. 1 and 2, or other suitable display elements, is shown coupled to a suitable output of the controller 64 by way of a shift light output or interface circuit 70. This circuit 70 provides a suitable interface or isolation between the microprocessor or controller output and the shift indicator, for example, by providing a suitable drive current for the output display or other indicator device in response to a control signal received from the controller 64. The user control module or other control elements 26 or 26b as illustrated in FIGS. 1 and 2 also are coupled to suitable inputs of the controller 64, and the digital display 32 (32b) shown in FIGS. 1 and 2 is coupled with a suitable output of the microprocessor or other controller 64.

The tachometer scale 22, 24 (24b) or the digital display 32 (32b) may be utilized in connection with the user control module 26 (26b) to input or preset desired shift setpoints (SP) in terms of the engine speed in RPM which represent an optimum speed for shifting in each of a plurality of gears over a given number of gears as applicable for a particular vehicle in a given situation. For example, a total of four or five gears might be provided in a drag race event. The optimum shift setpoint for each gear in terms of engine RPM may be empirically determined for a particular vehicle in a particular race situation or for any other use or application. The controller or microprocessor may be suitably programmed to permit this input process of a plurality of RPM values at which the shift indicator is to be illuminated or otherwise activated to provide a suitable observable indication to the driver or operator when the desired shift setpoint or each of the desired shift setpoints are reached during actual operation. Various ones of the pushbuttons or control elements illustrated in the control modules 26, 26b of FIGS. 1 and 2 may be activated in various preselected sequences to accomplish this, within the scope of the invention. One such sequence of operation is described, for example, in prior U.S. application Ser. No. 08/649,018, filed May 16, 1996 and entitled "High Performance Tachometer" (attorney docket no. AUTP003-1) and U.S. Ser. No. 09/023,622, filed Feb. 13, 1998 and entitled "High Performance Tachometer" (attorney docket no.

AUTP003-2). Other types of control elements and/or sequences of operation may be utilized for this process without departing from the invention.

Figure 4:
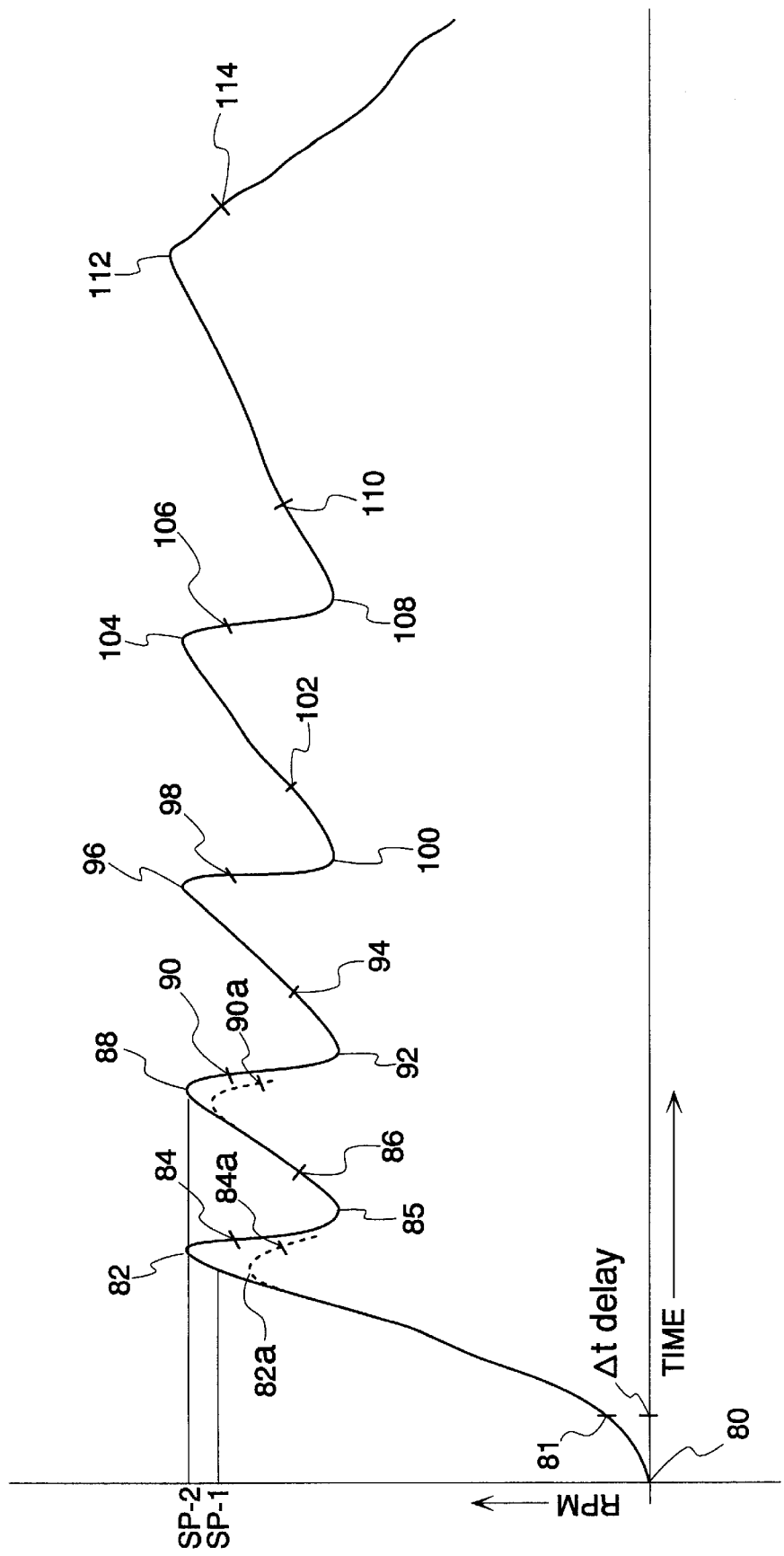
FIG. 4 is a diagram of engine speed profile for a multiple shift event such as drag races.

Referring now to FIG. 4, a typical engine speed or RPM profile is illustrated. It will be noted that the engine speed (in RPM) has a number of peaks and valleys as the operator or driver shifts gears through the course of an event, such as a drag race. In this regard, the engine speed profile illustrated in FIG. 4 may be taken as a general representation of the output of an engine RPM source 60 and/or engine input circuit 62 to the controller 64. In the illustrated embodiment, the shift indicator system of the invention includes Primary and Secondary logic systems and operates generally as described below with reference to various points indicated by reference numerals in the engine speed profile of diagram of FIG. 4. Generally speaking at a beginning point 81, a triggering signal is produced by the trigger device 66 described above with reference to FIG. 3. This signal causes the primary controller 64 to start a delay timer which may be incorporated in the controller 64. While this delay timer is running, the microprocessor disables the output signal to the shift light output circuit 70 and thus prevents operation of the shift indicator LEDs 28, 28b or other displays. Also, while the delay timer is running, the primary controller 64 does not monitor the engine speed profile or engine RPM input produced by the source 60 and the engine RPM input circuit 62.

The time period of the delay timer may be selected by the user or operator within predetermined limits, including a maximum time selected in accordance with the particular application, such as a particular vehicle and/or event or other situation which is to be monitored by the shift indicator system of the invention. In the illustrated embodiment, while the delay timer is running, the first shift setpoint will be indicated on the digital display 32, 32b, for example, by the symbol SP1. This indicates that the next illumination of the shift light indicator 28, 28b (or activation of some other indicator) will indicate that the engine speed has reached the first optimum point for shifting.

The time delay may be implemented, for example, in an event such as a drag race to prevent the device from mistaking tire spin, which is normally initially encountered when starting in low gear, for high enough RPM which would trigger the first shift setpoint. Thus, the time delay keeps the shift light from coming on and the system from advancing to the next shift setpoint in this situation and analogous situations. When the delay timer has run out, the secondary logic for the shift light display 28, 28b (or other display) is enabled and the primary logic controller 64 is enabled to begin its search for the shift pattern algorithm. The optimum RPM for the first shift SP1 will usually be reached, and the display will be activated by the secondary logic yielding a first peak 82 which represents the point at which the driver or operator actually shifts gears. Occasionally, a driver may "Short-Shift" (see 82a in FIG. 4). In this instance, the Secondary Logic would not have activated the Shift Indicator yet since he has already shifted into the next gear, the Primary Logic system would go through the following algorithm to confirm the shift and prepare for resetting to the next Shift Point RPM. Immediately after the shift is made (points 82 or 82a) the RPM begins to decrease. This gear change causes a change from a positive slope to a negative slope in the engine speed or RPM curve and thus will again cause the primary logic to disable the operation of the secondary logic so as to prevent further illumination of the shift indicator. The disabling point may be defined generally at the point 84 or 84a of the profile of FIG. 4, that is somewhat delayed after the first peak 82. The primary logic algorithm will wait for a predetermined amount of RPM decrease and/or a predetermined time after the perceived peak 82, helps to assure that the peak 82 is an actual peak in the profile and not a momentary oscillation or other artifact.

At point 86 on the profile of FIG. 4, at a point somewhat delayed after the next succeeding valley or RPM minimum 85, the RPMs again begin to increase in the second gear, thus, the slope of the profile has now changed from negative to positive. Upon detecting and verifying this negative to positive transition at delayed point 86, the Primary logic algorithm will again enable the secondary logic controlling the shift light operating signal and advance the shift point RPM to the next shift setpoint in both the Primary and Secondary logic systems, for example, by displaying SP2. This delay, as explained above, helps to eliminate the effects of oscillations of other artifacts which do not represent a negative peak or "valley." Thus, if and when the optimum RPM for the next shift setpoint is reached, the shift setpoint lamp or LED or other display will be energized to advise the operator or driver to make that pending second gear change. Again, as mentioned in regards to the first shift, if the driver shifts before achieving the SP2 RPM (i.e., a "Short Shift"), the "Short Shift" protection algorithm in the Primary logic will again proceed through the Peak and Valley verification logic and reset to SP3 even though the preselected Shift Point RPM had never been reached.

When the operator completes the next gear shift, in this case into third gear, another peak 88 or 88a of the profile will occur and the profile will transition from a positive slope to a negative slope once again. As with the point 84 described above, at a point 90 or 90a shortly subsequent to the peak 88 or 88a, the primary logic will again disable the secondary logic controlling the shift light signal and retain the shift setpoint RPM until the next minimum 92 is reached in the profile and the primary logic detects a transition from a negative slope to a positive slope, for example, shortly thereafter at point 94 in the profile. At this point, the microprocessor will again enable the secondary logic controlling the shift light (or other display) activating signal in the same fashion as described above with reference to point 86 of the profile. At this point, the Primary Logic algorithm also resets the Shift Point RPM to that preselected value for the next gear shift (i.e., SP3, for example) in both the Primary and Secondary logic system.

This same process will be repeated some integral number of times depending upon the number of gears to be used in the vehicle in the particular race or other situation. Thus, subsequent peaks and valleys 96, 100, 104, 108 and 112, and respective delayed points 98, 102, 106 and 110 will result in the same Primary Logic response as described above with respect to the similar preceding points on the profile of FIG. 4. Finally, when the last shift available in a particular vehicle or in a particular situation is reached, at the following positive to negative slope transition 112 and its associated delayed point 114, the Primary Logic will again disable the Secondary Logic system controlling the lamp or other display activating signal and will display a suitable symbol or indication such as the word "DONE," in the digital or alphanumeric shift setpoint display 32, 32b. In one embodiment, such as with a four speed transmission, this disabling and display of the word DONE or a suitable similar display will take place at the preceding negative to positive transition delayed decision point 110.

If at any time the engine speed reaches or goes below some preset minimum RPM value, the Primary Logic algorithm will reset to the beginning of the process, displaying the first shift setpoint indication SP1 in the alphanumeric display 32, 32b and re-enabling the delay timer as described above. This point may be some minimal RPM below which it is assumed that the vehicle has been returned to its first or lowest gear or the lowest gear to be monitored by the shift indicator system of the invention for a particular application or situation.

While the engine speed or RPM profile of FIG. 4 and the above description of operation of one embodiment of the shift indicator of the invention have been illustrated and described with reference to a five gear race car in a drag race, it should be appreciated that the described shift indicator system may be utilized in other applications or situations without departing from the invention.

Having thus described operation of the invention in one embodiment, the following discussion will describe generally the manner in which the controller 64 selects shift setpoints, turns the Secondary Logic controlling the shift indicator on and off, and implements an algorithm for carrying out this operation in the manner described above, based upon operator input signals, as discussed above and the engine RPM input signal representing the engine speed or RPM profile of FIG. 4.

Advantageously, the operation described above in connection with the monitoring of the engine profile is such that the system of the invention, and particularly the Primary Logic controller 64 or other controller can advance to the next shift setpoint, even in the event that the engine never reaches the preselected RPM level or shift setpoint for the present shift setpoint. That is, it is not necessary that the engine ever reach a given RPM setpoint or exceed the setpoint in order for the system of the invention to move on and display the next setpoint. This is done in response to a transition from a negative slope to a positive slope in the engine speed profile, as described above, which indicates that the driver has shifted. This allows for the driver or operator to decide to shift at some point other than the setpoint, for example, during a maneuver known as short shifting. Thus, even when the operator short shifts at some point short of the existing setpoint, the resulting transitions or peak and valley in the engine speed profile, caused by the act of shifting and continued acceleration by the operator will cause the Primary Logic system to advance to the next setpoint. The algorithm used by the controller to determine when a shift has occurred, based on the engine speed profile as generally shown in FIG. 4, accomplishes this changing or advancing of shift setpoint after a shift, regardless of the actual value of engine RPM and regardless of whether the engine ever reaches the previous shift setpoint.

Figure 5:
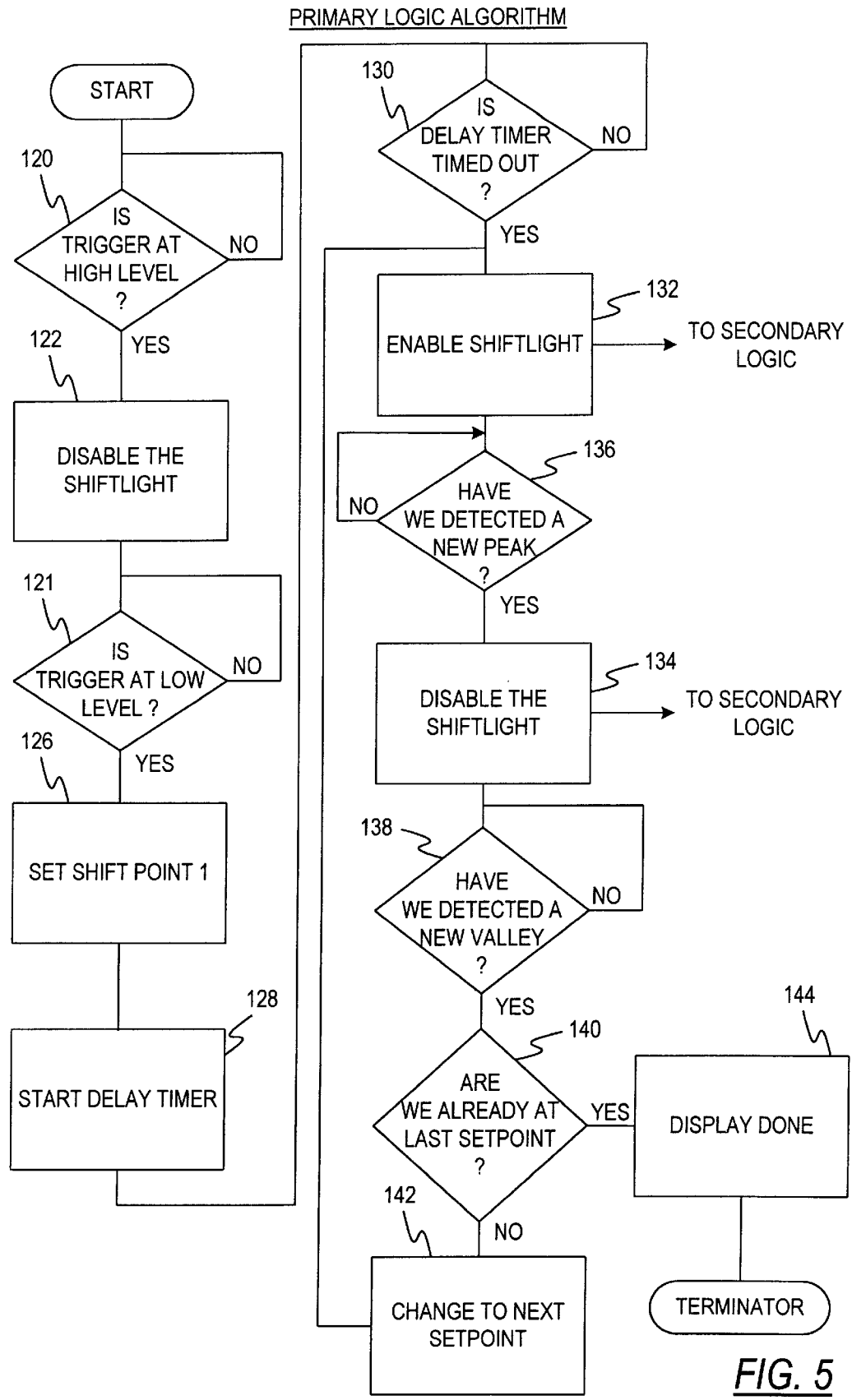
FIG. 5 is a flowchart for a four shift light algorithm.

One embodiment of a Primary Logic algorithm for use in the system of the invention is shown in the flowchart of FIG. 5 and is designated for convenience as a "four shift light algorithm." It will be noted that the flowchart refers generally to elements of the above-described operation including detecting the trigger signal (blocks 120, 121), disabling and enabling the shift light (blocks 122, 124 and 132, 134) setting the shift point (block 126), and operation of the delay timer (block 128, 130). Other blocks of FIG. 5 indicate others of the above-described operations, including detecting a peak or valley (blocks 136, 138), determining whether the last setpoint has been reached (block 140) and if not, advancing to the next setpoint (block 142), and if so, displaying "Done" (block 144). In one embodiment, this algorithm may be generally described as using a peak and valley routine and a shift light routine, which are generally described as follows.

The peak and valley routine is designed to capture the peaks and valleys of the engine RPM profile. This may include the recording of the times that various peaks and valleys occur during a race as described more fully in the above-mentioned co-pending U.S. application Ser. No. 08/649,018 and U.S. application Ser. No. 09/023,622. Generally speaking, the peak and valley routine examines the RPM profile such as the profile of FIG. 4, and looks to see if the slope is positive or negative going. If the RPM is increasing or decreasing by a predetermined amount or more, the peak and valley routine will begin monitoring for a maximum or minimum value. The maximum and minimum values of the profile or so-called peaks and valleys become defined by the peak and valley routine and indications of these will be given to the primary logic algorithm section of the shift light routine. These indications will be slightly delayed from the time of the actual peaks and valleys as indicated by the somewhat delayed points 84, 86, 90, etc. as indicated in the diagram of FIG. 4 and as discussed hereinabove.

The shift light routine will select the next shift setpoint in sequence and enable and disable the shift indicator display. Briefly, if the currently sensed engine RPM is at or above the value of the currently selected shift setpoint RPM and the display is enabled, the display will be activated to alert the operator that the shift setpoint has been reached. Thus, in operation, the shift light routine will initially select the first shift setpoint or shift setpoint one (SP1). When the engine RPMs reach or exceed shift setpoint one's RPM value, the shift indicator display will be activated. When the engine RPM goes below the shift setpoint, the display will be deactivated.

In the shift light routine, the sequencing through the shift light setpoints is initiated by the ARMS input, from the trigger device 66 and input circuit 68 to the controller 64 as described above (see FIG. 3). This begins the above-described delay timer which prevents the shift setpoint from sequencing and the shift setpoint indicator display from being activated during the initial time delay, for example, to accommodate some initial tire spin in low gear. After the expiration of the delay time, the display is enabled and the shift setpoint can be advanced or sequenced. The display will again be disabled when the next peak is detected in the engine RPM profile as defined by the peak and valley routine. Similarly, when the peak and valley routine detects the next valley in the profile, the shift setpoint will advance or sequence to the next shift setpoint. This process will repeat through the number of gears to be used in the particular application, whereupon the symbol DONE will be displayed and the shift setpoint indicator display will again be disabled. The shift light algorithm will reset when the RPM profile drops below some preselected minimum RPM, that is, resetting to activate setpoint one and wait for the source signal or trigger to begin monitoring the RPM profile again.

Referring now to FIGS. 6a–e and 7a–d, circuitry for use in one embodiment of the system of the invention is illustrated. Circuit portions in FIGS. 6a–6e and 7a–7f which correspond to the blocks described above with reference to FIG. 3 are designated by the same reference numerals used in FIG. 3. FIGS. 6a–e show a meter board or circuitry associated with the driving of the meter 20 (20b). The circuits include a power supply circuit 160, which in the illustrated embodiment provides suitable regulated DC voltage supplies to other portions of the circuitry. A shift light drive circuit portion 70 includes a switching device such as a transistor device 166 which is driven directly from a microcontroller output to be described below with reference to FIGS. 7a–d. This circuit provides a means for the controller 64 to directly drive the shift light 30 (30b). A further circuit portion 68 provides isolation and voltage level conversion between the controller and the incoming trigger signal, described above. In the illustrated embodiment, an optocoupler 172 provides this isolation.

Figure 6A:
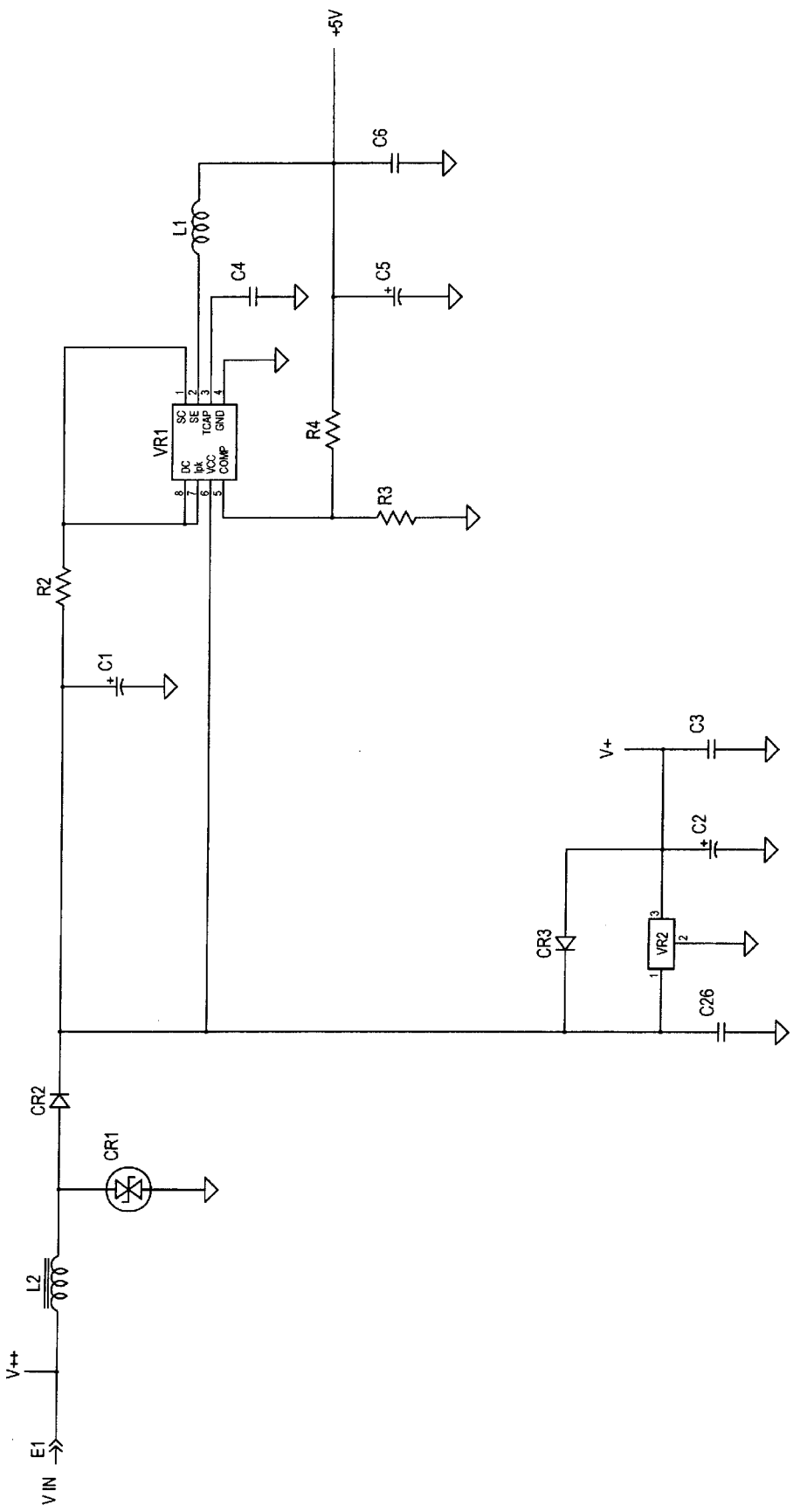
FIGS. 6a–6e form a circuit schematic of one portion of a circuit for the shift indicator system.
Figure 6B:
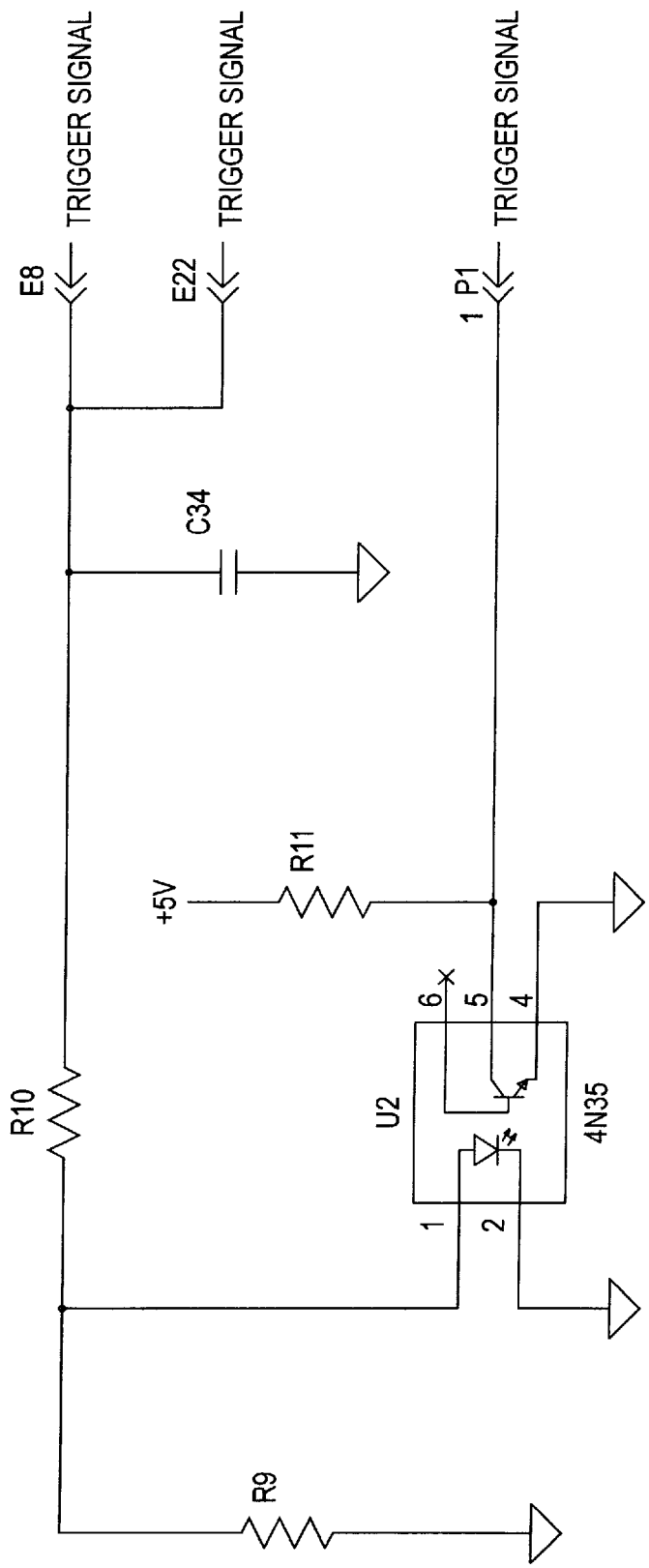
Figure 6C:
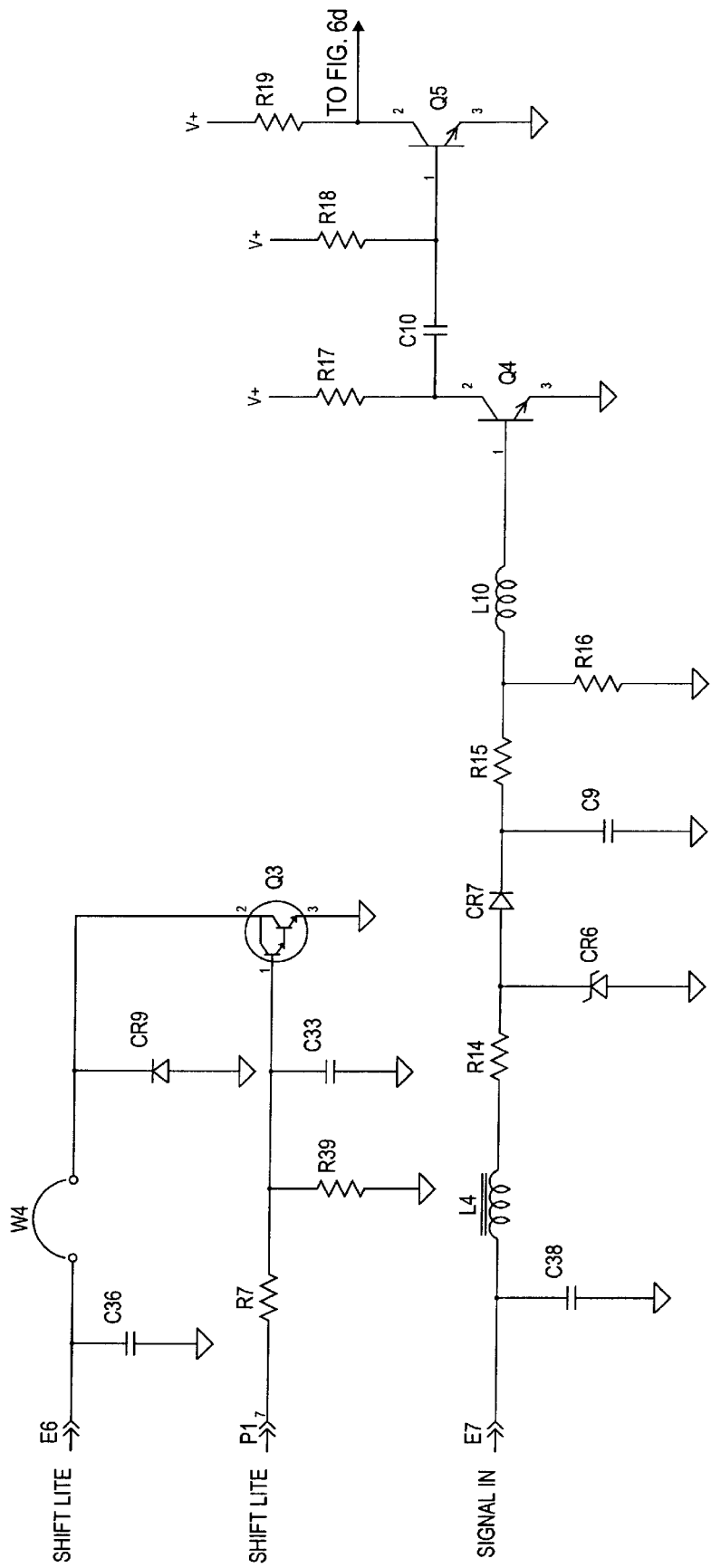
Figure 6D:
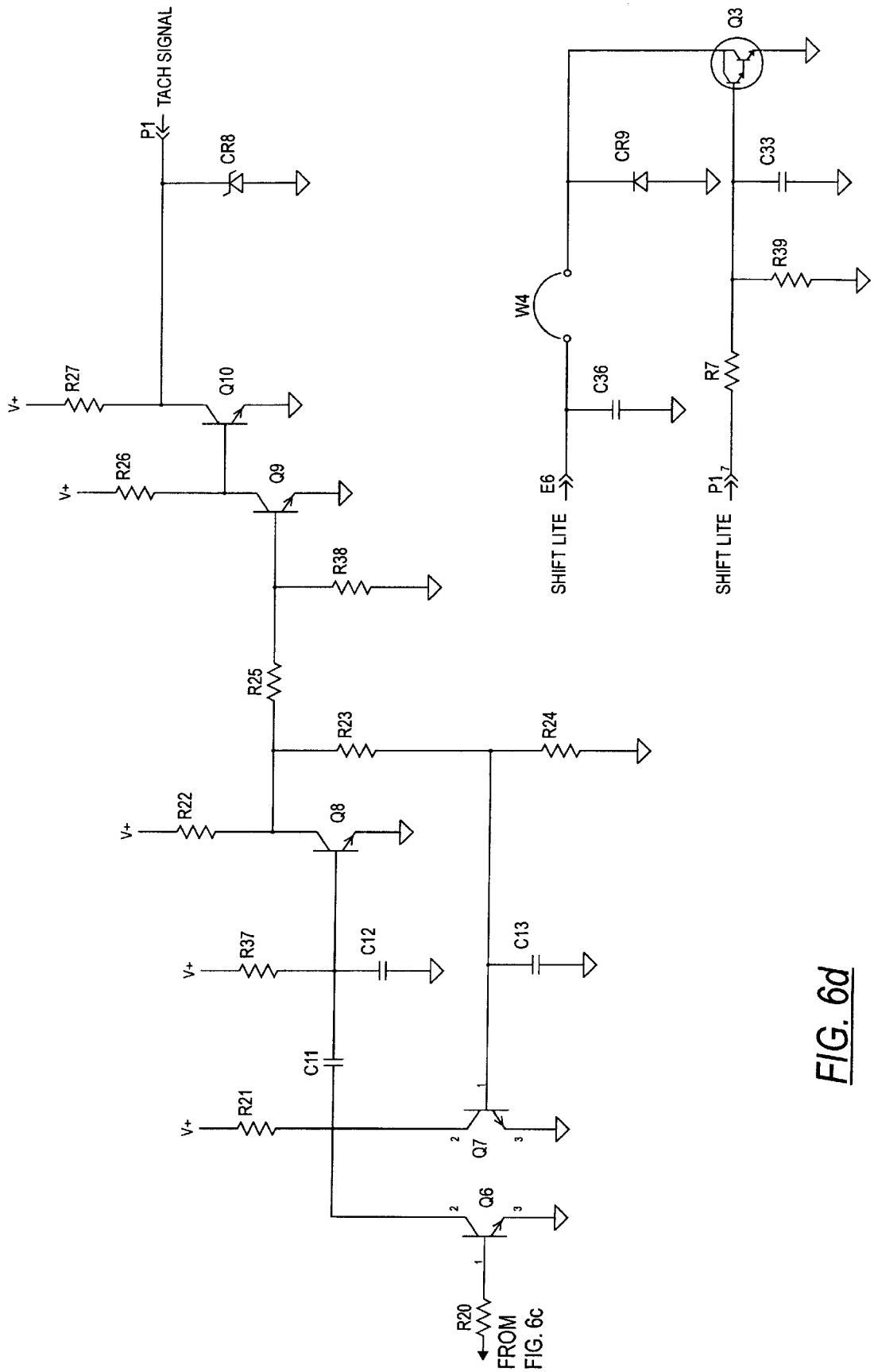
Figure 6E:
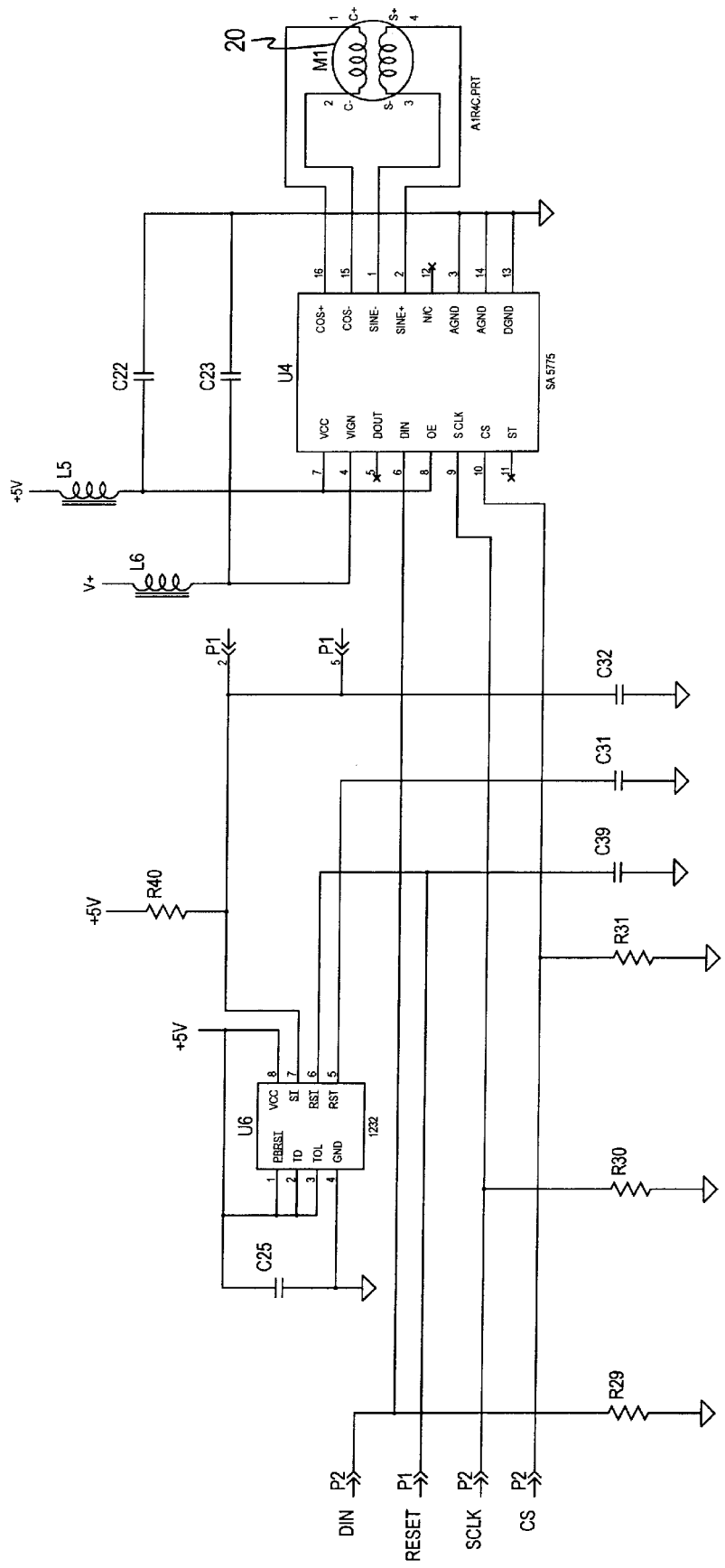
Figure 7A:
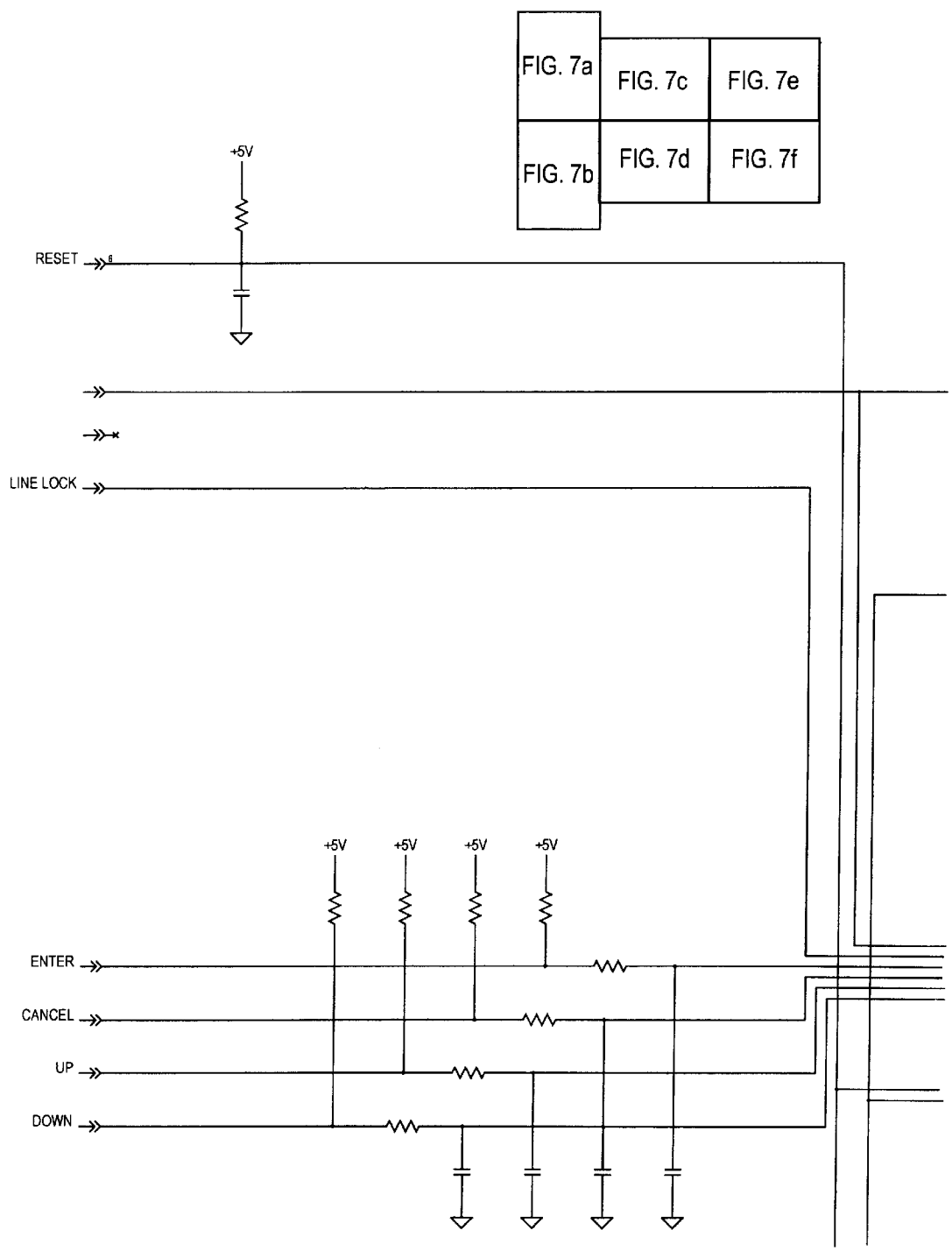
FIGS. 7a–7f form a circuit schematic of another portion of a circuit for the shift indicator system.
Figure 7B:
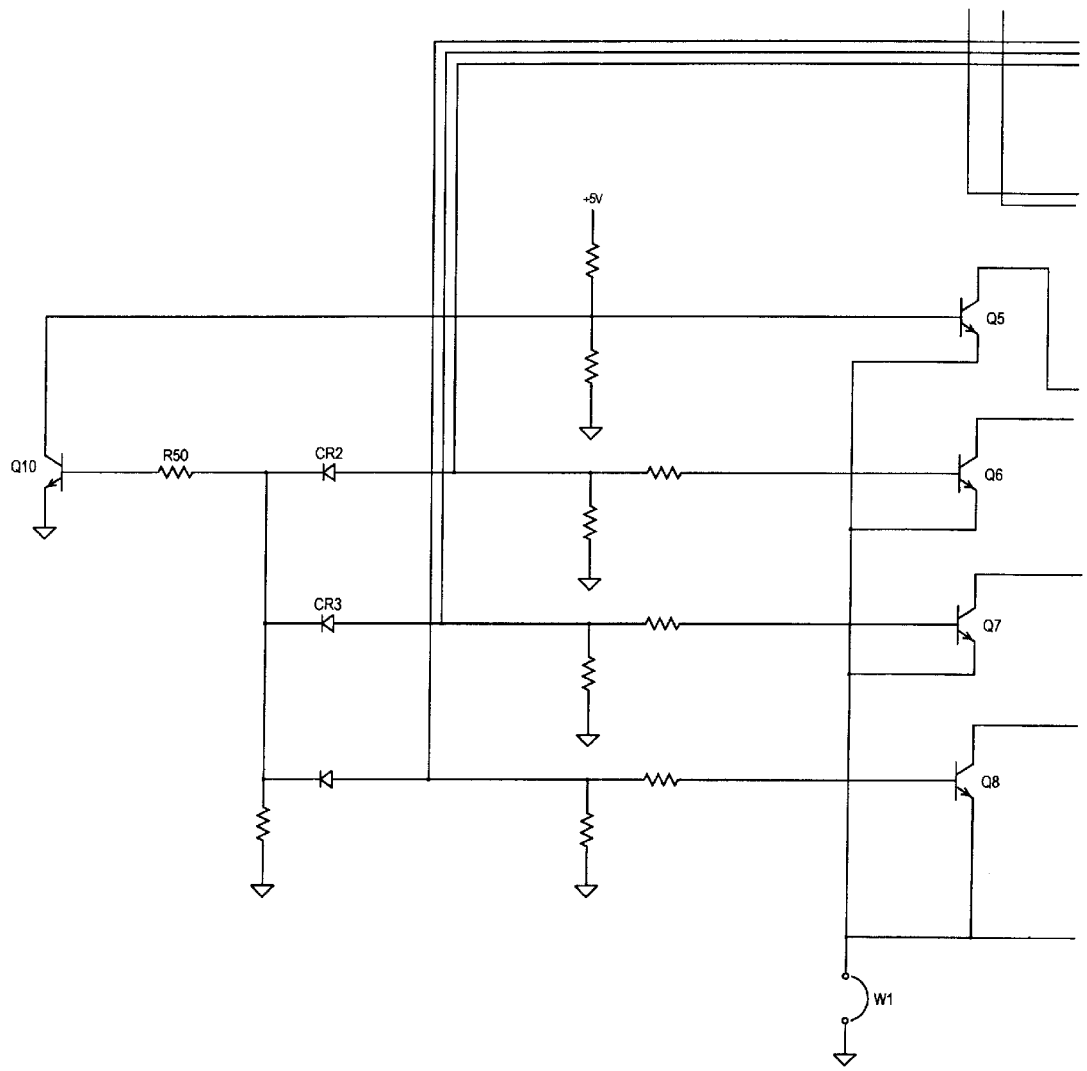
Figure 7C:
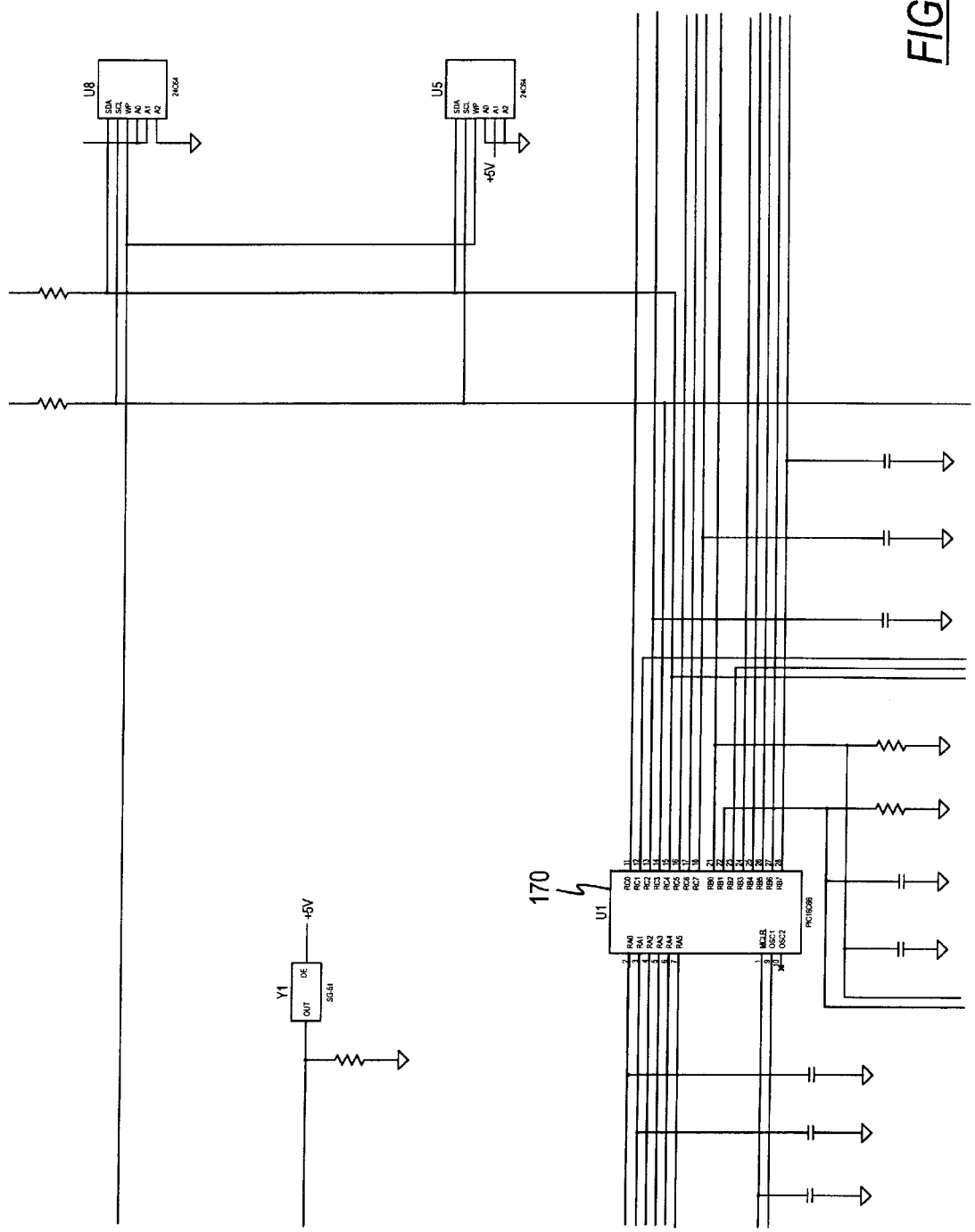
Figure 7D:
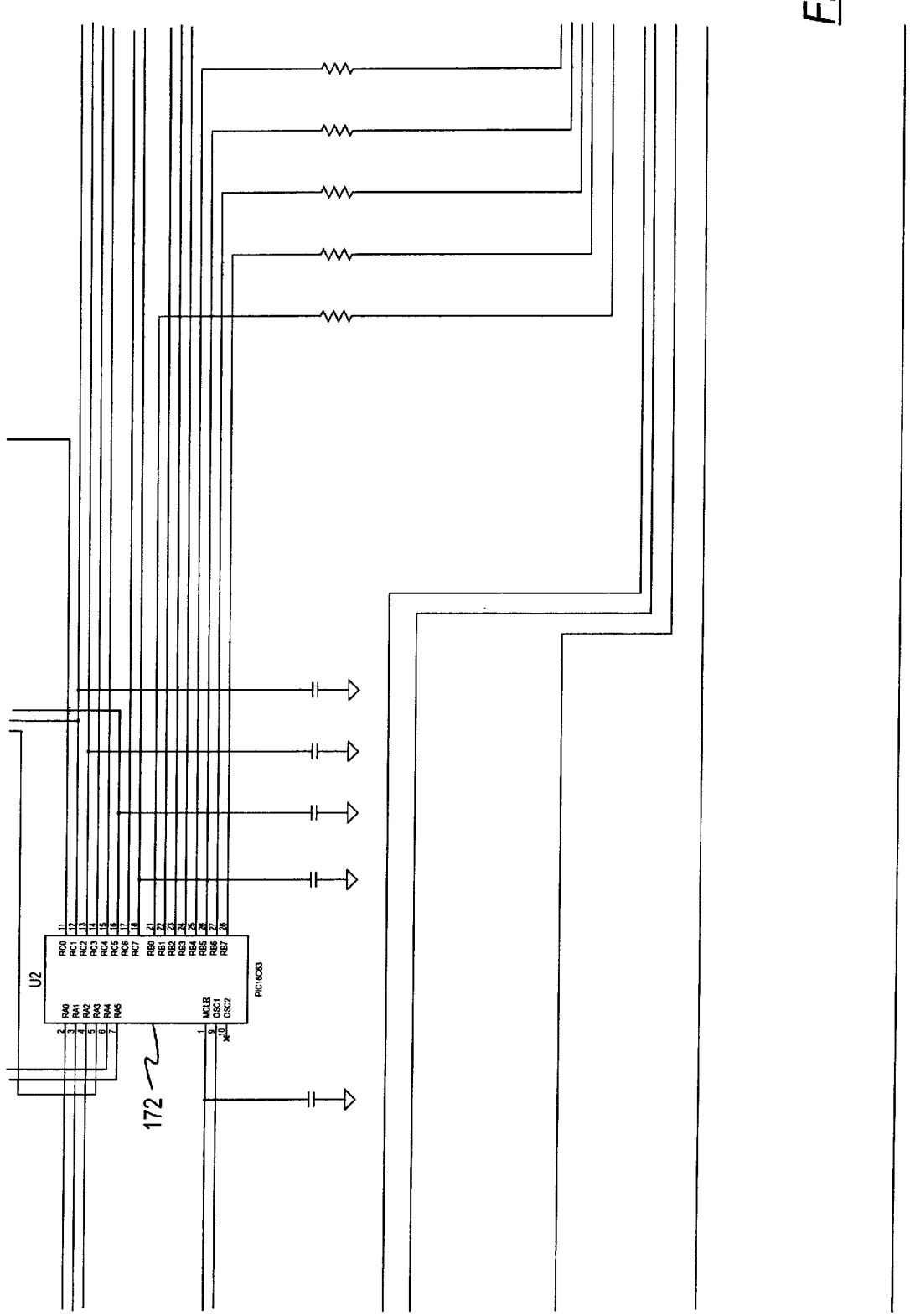
Figure 7E:
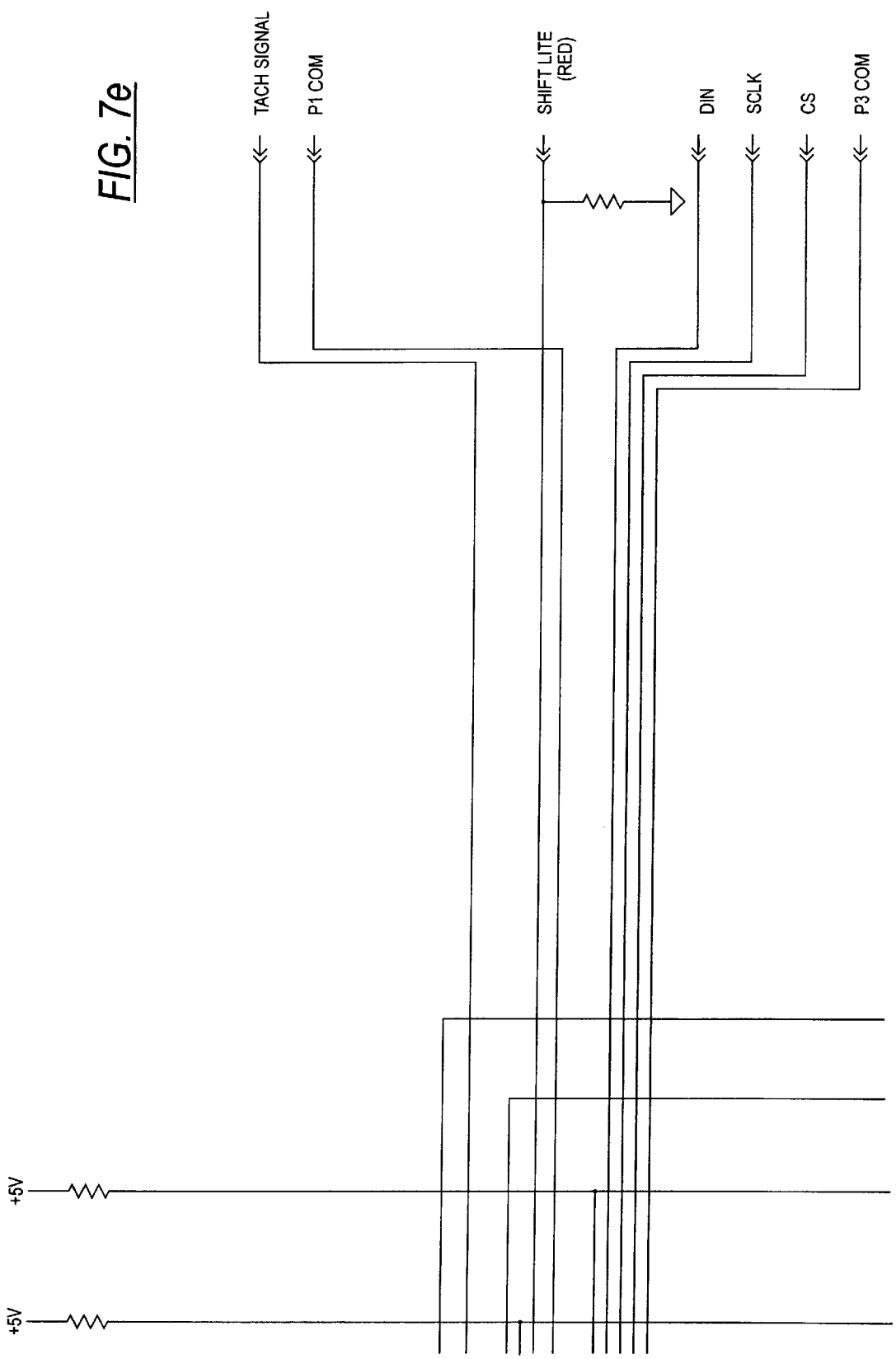
Figure 7F:
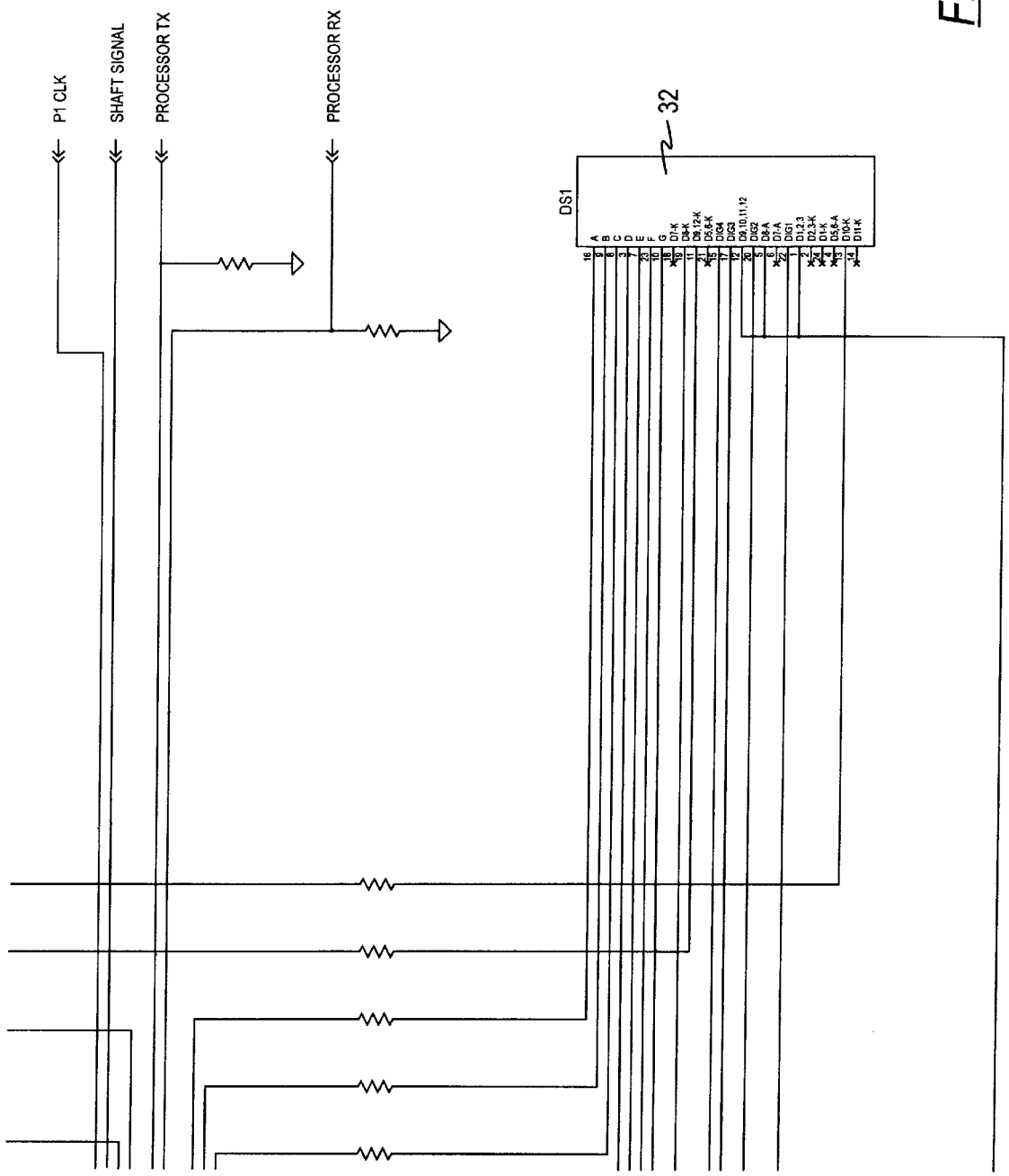

The circuit 62 as shown in FIG. 6c functions to receive the RPM signal or engine speed profile from a suitable signal source (60) as discussed above and acts as a signal conditioner circuit. As mentioned above, the source (60—see FIG.

3) of engine RPM signal could be an ignition coil, an output from an ignition, a crank trigger, a proximity sensor working off flywheel tech, or fuel injection control signals, etc. The circuit 62 will take the signal from the RPM signal source and filter out high voltage spikes, high frequency noise and condition the signal for a desired pulse with a voltage level for input at a tach signal input of the controller to be described below.

Referring now to FIGS. 7a–f, the controller circuit or board is illustrated. The circuit includes the controller 64 which in the illustrated embodiment comprises a master/slave controller or processor set including a master microcontroller 170 and a slave microcontroller 172 or can be run by a single microcontroller of greater capability without the need for a slave microcontroller. In the illustrated embodiment, the master and slave microcontrollers comprise PIC microcontrollers of the types PIC 16C66 (master 170) and PIC 16C63 (slave 172), from Microchip Technology Inc. of Chandler, Ariz. Master controller 170 communicates with the user, controls the shift light and instructs the slave controller 172 to perform various functions. The master controller 170 also interprets all incoming command signals from the user accessible control switches or control panel 26 (26b). The master controller 170 is also coupled with two EEPROMs 174 and 176 which store calibration and set up parameters. In the illustrated embodiment these EEPROMs are of the type designated 24C64. The EEPROMs may be of the type available from Micron Electronics or others under the above designated number, and are serial 2K by 8 configuration. The slave processor or controller 172 handles seven segment display control and control displays on the seven segment display panel (DS1) 32 (32b) as instructed by the master controller 170. The slave processor 172 drives the display 32 (32b) in a common cathode configuration in connection with driver transistors 180. In the illustrated embodiment, the display is a high intensity, seven-segment, four-digit LED display with accessories, of the type designated CC25-14 from Kingbright USA Corp.

Returning briefly to the meter circuit or board of FIGS. 6a–e, the meter, in the illustrated embodiment, is an air core meter and in the illustrated embodiment is driven by an air core driver which may be of the type generally designated CS4172 from Cherry Semiconductor Corporation of East Greenwich, R.I. The air core meter may be the type available as Auto Meter part number 3858-24-31 from Auto Meter Products, Inc. of Sycamore, Ill. or any other suitable type.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A shift indicator system for indicating to a vehicle operator when to shift gears of a vehicle, said system comprising:
a memory which stores a sequence of shift setpoints corresponding respectively to a plurality of preselected RPM values;
a controller which selects one of said shift setpoints in response to a predetermined algorithm monitoring the profile of an engine RPM signal and which then produces a shift display enable or disable signal in accordance with said predetermined algorithm; and
a shift setpoint display which produces an observable indication to the operator in which shift setpoint has been selected by said algorithm.

2. The system of claim 1 and further including a shift display which produces an observable indication for prompting the operator to shift gears in response to said display enable signal and which is disabled in response to said display disable signal.

3. The system of claim 1 and further including a trigger device which produces a trigger signal which enables said controller to initially select a first one of said shift setpoints and to respond to said RPM signal.

4. The system of claim 2 and further including a delay timer which disables the controller's monitoring of engine RPM profile for a predetermined delay time following production of said trigger signal.

5. The system of claim 3 wherein said delay timer is implemented in said controller.

6. The system of claim 5 wherein said delay time is user selectable.

7. The system of claim 3 wherein said RPM signal is a substantially continuous signal profile having a slope, and wherein said controller, after initially selecting said first shift setpoint in response to said trigger signal thereafter advances in sequence to subsequent shift setpoints in said sequence in response to respective subsequent changes in the slope of said RPM signal profile from negative to positive.

8. The system of claim 7 wherein said controller produces said shift display disable signal without advancing to a subsequent shift setpoint in response to changes in the slope of said RPM signal profile from positive to negative subsequent to said trigger signal.

9. The system of claim 7 wherein said controller produces the shift display disable signal in response to the Nth change in said RPM signal slope from negative to positive, where N is a positive integer.

10. The system of claim 8 wherein said controller produces the shift display disable signal in response to the Nth change in said RPM signal slope from negative to positive, where N is a positive integer.

11. The system of claim 7 wherein said controller resets to the first shift setpoint in response to the value of the RPM signal reaching or going below a predetermined reset RPM value.

12. The system of claim 11 where in said reset RPM value is selectable by an operator.

13. The system of claim 8 wherein said controller resets to the first shift setpoint in response to the value of the RPM signal reaching or going below a predetermined reset RPM value.

14. The system of claim 13 wherein said reset RPM value is selectable by an operator.

15. The system of claim 10 wherein said controller resets to the first shift setpoint in response to the value of the RPM signal reaching or going below a predetermined reset RPM value.

16. The system of claim 1 wherein the shift setpoint display produces said observable indication to the operator in response to a shift setpoint display enable signal; and wherein said controller is further adapted to produce said shift setpoint display signal in response to selection of each shift setpoint.

17. The system of claim 16 wherein said controller produces said shift display enable and disable signals, selects a shift setpoint and produces a corresponding shift setpoint display signal in response to changes in the slope of said RPM signal profile.

18. The system of claim 16 wherein said controller produces said shift display disable signal and produces a terminal shift setpoint display signal in response to an Nth change in said RPM signal slope where N is a positive integer, said shift setpoint display producing an observable indication to an operator that the last shift setpoint in said sequence has been reached in response to said terminal point shift setpoint display signal.

19. The system of claim 1 wherein said controller comprises a microprocessor.

20. The system of claim 1 and further including an operator accessible control whereby the operator can enter a total number of shift setpoints needed.

21. A shift indicator method for indicating to a vehicle operator when to shift gears of a vehicle, said method comprising:

storing in a memory a sequence of shift setpoints corresponding respectively to a plurality of preselected RPM values;

a controller selecting one of said shift setpoints in response to a predetermined algorithm monitoring the profile of an engine RPM signal and then producing a shift display enable or disable signal in accordance with said predetermined algorithm; and producing an observable indication to the operator in which shift setpoint has been selected by said algorithm.

22. The method of claim 21 and further including producing an observable indication for prompting the operator to shift gears in response to said display enable signal and which is disabled in response to said display disable signal.

23. The method of claim 21 and further including a trigger device which producing a trigger signal which enables said controller to initially select a first one of said shift setpoints and to respond to said RPM signal.

24. The method of claim 22 and further including disabling the controller's monitoring of engine RPM profile for a predetermined delay time following production of said trigger signal.

25. The method of claim 24 wherein said delay time is user selectable.

26. The method of claim 23 wherein said RPM signal is a substantially continuous signal profile having a slope, and said controller, after initially selecting said first shift setpoint in response to said trigger signal thereafter advancing in sequence to subsequent shift setpoints in said sequence in response to respective subsequent changes in the slope of said RPM signal profile from negative to positive.

27. The method of claim 26, said controller producing said shift display disable signal without advancing to a subsequent shift setpoint in response to changes in the slope of said RPM signal profile from positive to negative subsequent to said trigger signal.

28. The method of claim 26, said controller producing the shift display disable signal in response to the Nth change in said RPM signal slope from negative to positive, where N is a positive integer.

29. The method of claim 27, said controller producing the shift display disable signal in response to the Nth change in said RPM signal slope from negative to positive, where N is a positive integer.

30. The method of claim 26, said controller resetting to the first shift setpoint in response to the value of the RPM signal reaching or going below a predetermined reset RPM value.

31. The method of claim 30 wherein said reset RPM value is selectable by an operator.

32. The method of claim 27, said controller resetting to the first shift setpoint in response to the value of the RPM signal reaching or going below a predetermined reset RPM value.

33. The method of claim 32 wherein said reset RPM value is selectable by an operator.

34. The method of claim 29, said controller resetting to the first shift setpoint in response to the value of the RPM signal reaching or going below a predetermined reset RPM value.

35. The system of claim 21, the shift setpoint display producing said observable indication to the operator in response to a shift setpoint display enable signal; and said controller is further producing said shift setpoint display signal in response to selection of each shift setpoint.

36. The method of claim 35, said controller producing said shift display enable and disable signals, selecting a shift setpoint and producing a corresponding shift setpoint display signal in response to changes in the slope of said RPM signal profile.

37. The method of claim 35, said controller producing said shift display disable signal and producing a terminal shift setpoint display signal in response to an Nth change in said RPM signal slope where N is a positive integer, said shift setpoint display producing an observable indication to an operator that the last shift setpoint in said sequence has been reached in response to said terminal point shift setpoint display signal.

38. The method of claim 21 and further including the operator entering a total number of shift setpoints needed.

* * * * *